United States Patent [19]
Cielker et al.

[11] Patent Number: 5,810,277
[45] Date of Patent: Sep. 22, 1998

[54] APPARATUS FOR THE STORAGE AND WITHDRAWAL OF AN ELASTICALLY FLEXIBLE ROPE MATERIAL

[75] Inventors: Werner Cielker, deceased, late of Birgel; Klaus Lehnen, executor, Gerolstein, both of Germany

[73] Assignee: Katimex Cielker GmbH, Germany

[21] Appl. No.: 801,708

[22] Filed: Feb. 14, 1997

[30] Foreign Application Priority Data

Feb. 14, 1996 [DE] Germany .................. 196 05 410.9

[51] Int. Cl.$^6$ .............................. B65H 75/36; B08B 9/02; H02G 1/08
[52] U.S. Cl. .................. 242/395; 242/397.1; 242/397.5; 242/407; 254/134.3 FT; 15/104.33
[58] Field of Search ................. 242/395, 397.1, 242/397.5, 405, 405.3, 406, 407; 254/134.3 FT; 15/104.33

[56] References Cited

U.S. PATENT DOCUMENTS

| | | | |
|---|---|---|---|
| 1,761,592 | 6/1930 | Seidel | 242/395 |
| 2,102,917 | 12/1937 | Rolland | 242/395 |
| 2,272,387 | 2/1942 | Therrien | 242/407 |
| 3,306,584 | 2/1967 | Menetrier | 242/397.1 |
| 3,480,983 | 12/1969 | Caperton | 15/104.33 |
| 3,504,866 | 4/1970 | Palynchuk et al. | 242/407 |
| 3,662,421 | 5/1972 | Caperton | 15/104.33 |
| 3,673,627 | 7/1972 | Caperton | 15/104.33 |
| 4,266,709 | 5/1981 | Kruger | 254/134.3 FT |
| 5,588,613 | 12/1996 | Nagy | 242/395 |

*Primary Examiner*—John M. Jillions
*Attorney, Agent, or Firm*—Liddell, Sapp, Zivley, Hill & LaBoon, L.L.P.

[57] ABSTRACT

This invention relates to an apparatus for the storage and withdrawal of an elastically flexible rope material (1), particularly a push-and-pull wire preferably having a circular cross-section and particularly consisting of glass-fiber plastic, preferably for introducing cables, photoconductors, and/or other lines into cable tubes or cable protection tubes or empty tubes, the apparatus comprising a storage drum (2), with the elastically flexible rope material (1) nestling against the inner wall (3) thereof, and a housing (4) having arranged therein a rotational axle (5) for rotationally supporting the storage drum (2). To facilitate the winding-up and winding-off of the elastically flexible rope material (1) during the handling of great lengths of the material (1) it is proposed according to the invention that the rope material (1), after leaving the storage drum (2) and before leaving the housing (4), is adapted to be driven over at least a part-portion thereof by a driving belt which acts on the rope material (1) in a non-positive fashion.

39 Claims, 6 Drawing Sheets

APPARATUS FOR THE STORAGE AND WITHDRAWAL OF AN ELASTICALLY FLEXIBLE ROPE MATERIAL

This invention relates to an apparatus for the storage and withdrawal of an elastically flexible rope material, in particular a push-and-pull wire preferably having a circular cross-section and being made particularly of glass-fiber plastic, preferably for pulling cables, photoconductors and/or other leads into cable or line protection tubes or into empty tubes, the apparatus comprising a storage drum, with the elastically flexible material nestling against the inner wall thereof, and a housing or supporting frame having arranged therein a rotational axle for rotatably supporting said storage drum.

From document DE 30 31 570 C3, for example, an apparatus is known for the storage and withdrawal of an elastically flexible rope material of the type concerned. This known apparatus comprises a rotatably supported storage drum having the elastically flexible material nestled against the inner surface thereof. In addition, this known apparatus comprises a housing in which the storage drum is arranged for rotation.

In addition, apparatus are known in which the elastically flexible rope material is received in and withdrawn from a cage-like receiving device. Here, this cage-like receiving device comprises a center axis which simultaneously is the rotational axle having fixed to it plural rod members, usually at least three, which are substantially U-shaped in cross-section, wherein the webs of these rod members extending in the axial direction of the storage device locate on an orbit. The elastically flexible material nestles against these webs so that the material, by virtue of its internal stress and the tendency to keep the material elongated, nestles against the webs and between the legs of the U-shaped rods. The cage-like storage device is rotatably supported in a supporting frame and is used particularly in cases where a high-weight elastically flexible material of considerable length is to be wound up or off. In contrast thereto, the apparatus described in document DE 30 31 570 C3 particularly serves to receive rope material of a length ranging from approximately 20 to 30 meters. Here, the storage capacity depends on the constructionally given size of the apparatus.

The above-mentioned apparatus for the storage and withdrawal of an elastically flexible rope material have proven worthwhile in practice. However, with an increasing length of the elastically flexible material to be stored and withdrawn great forces turned out to be required for winding the rope material up or off.

Basing on this prior art, a problem of the present invention is to further develop an apparatus of this type so that the storage and withdrawal of the elastically flexible material is facilitated and accomplished at low forces required even where considerable lengths of the material are to be wound up or off.

The solution of this problem provides for the material being adapted to be driven over at least a part-portion thereof by a driving means non-positively acting on the rope material, after the material leaves the storage drum and before it leaves the housing or the supporting frame.

According to the invention it is therefore provided that a force acts over a partial distance on the rope material in the housing or supporting frame area, which force assists the movement of the rope material during its withdrawal from the housing or storage drum and similarly during pushing the material back into the housing or supporting frame. This force acts on the rope material in a non-positive or frictional fashion, wherein preferably such driving means are employed which substantially operate at almost no slippage or only very little slippage.

In this connection it has shown to be an advantage that the driving means is provided in the form of an endless driving belt which passes around two pulleys at least, wherein at least one pulley is relatively unrotatably mounted on the rotational axle and at least one pulley is driven. In this way, a first pulley may be provided which for instance is relatively unrotatably fixed on the rotational shaft of the storage drum or on an axle extending parallel thereto and which is wrapped by a driving belt over a part-portion thereof. The driving belt then passes over a second pulley provided with a driving means. By the rotation of the second pulley the first pulley is driven through the driving belt, said driving belt frictionally transmitting the driving power to the rope material, which means that the rope material extends relative to the driving belt in a manner such that the movement of the driving belt is transmitted to the rope material with very little slippage occurring and thus assists the winding up and off of the rope material.

Preferably, the rope material is arranged over part of the circumference of at least one pulley between the pulley and the driving belt, so that the rope material reposes on the pulley on one hand and is covered by the pulley on the other hand, so that the tension force of the driving belt is transmitted at least partially through the rope material to the pulley. In this form of execution the driving belt transmits the driving power through the rope material to the pulley, whereby the rope material can move with the pulley and the driving belt at substantially no or very little slippage.

The driving belt may be in the form of a toothed belt and at least one of the pulleys may be in the form of a toothed disk. However, it would be advantageous that both said one and said other pulley were in the form of a toothed disk. In this form of execution, power transmission between the driving belt and the pulleys takes place in a non-positive fashion so that in the present case one may start from a non-slipping driving arrangement.

A further feature of the invention provides for the second pulley arranged on an axle spaced from the rotational axle, within the housing or supporting frame. Preferably, the pulley that is relatively unrotatably fixed on the axle is driven.

According to a further development of the invention it is provided that the driving belt passes over two pulleys having a different diameter and that the pulley having the smaller diameter is preferably driven. Thereby a transmission ratio is established which facilitates the driving of a great diameter pulley for instance, with the force to be exerted being reduced and the distance of rotation increased.

Preferably, the pulley relatively unrotatably fixed on the rotational axle has a diameter which substantially corresponds to the diameter of the storage drum, so that the rope material ascending this pulley from the storage drum is bent only in a portion which does not exceed the maximum bending capacity of the rope material. Therefore, the pulley is adapted to the rope material or storage drum and particularly to the diameter of the storage drum and also does not exceed the outer diameter of the storage drum.

Each pulley preferably has a circumferentially provided guide groove of a U-shaped cross-section for the driving belt. Accordingly, the pulley comprises in the circumferential portions thereof two radially oriented plate-shaped members adapted to guide both the driving belt and the rope material, which is arranged for instance between the pulley and the driving belt.

When employing a toothed belt, provisions are made for tooth members arranged in the lateral rim portion of the guide groove which mesh with corresponding teeth of the driving belt. Here, it is possible to have tooth members arranged only at one side of the guide groove. However, in a preferred manner it is provided that a row of tooth members is arranged on each of the plate-shaped members of the pulley, with the rope material being guided between said tooth members.

A further improvement in guiding the rope material on the circumferential surface of the driving belt is attained by forming a substantially semicircular recess in the bottom of the guide groove, of which the radius substantially corresponds to the radius of the rope material. An alternative may provide for the driving belt having a substantially semicircular recess formed on its surface facing the pulleys, with the radius of said recess substantially corresponding to the radius of the rope material. Of course, a third alternative resides in that both the driving belt and the pulley have formed a semicircular recess each in the above-identified location, so that the rope material is frictionally connected to the respective components within the recess of the pulley on one hand and within the recess of the driving belt on the other hand. Here, the elastically flexible rope material is assumed to have a circular cross-section. However, different cross-sectional shapes are also generally conceivable, for instance a square cross-sectional shape, in which case the recesses in the driving belt and in the pulley would be adapted in a corresponding manner.

The rope material wraps the pulley preferably at an angle of wrap between 180° and 280°. For that reason also greater or smaller angles of wrap are possible as well as multiple wrapping of one or even both pulleys. For guiding the rope material it is provided that the same is guided within a guide tube before and/or after it reaches the pulley which is wrapped by the rope material in a part-portion thereof. The rope material is thus guided within a guide tube from the storage drum until it reaches the pulley to be wrapped, on one hand. On the other hand, a guide tube is provided adapted to receive and guide the rope material to the outside of the housing upon withdrawal from the storage drum immediately after leaving the pulley.

Onto the guide tube which guides the rope material out of the housing an angled guide member may be plug-fitted, which is rotatably supported on the guide tube so that the rope material is even guided also in a portion outside the housing, whereby easier introduction of the rope material for instance into a cable tube is ensured.

Another feature of the invention provides for the guide tube leading the rope material out of the housing to be arranged laterally beside the driving belt, preferably between the driving belt and the storage drum. Thus the rope material after having left the pulley is guided in a guide tube which extends substantially parallel to the driving belt section between said two pulleys. Here, it is provided that the rope material is deflected into the housing interior portion.

A further development of the apparatus according to the invention provides for the driving belt to be manually driven through a pulley, preferably by means of a crank handle. On using an elastically flexible rope material having a larger cross-section or greater length to wind up or off it has shown to be advantageous that the driving belt is driven via a pulley by means of a motor, particularly an electric or hydraulic motor. In this case a gearing, particularly an angular gearing designed with the desired reduction for allowing the rope material to be wound off or up uniformly can be provided.

On arranging the storage drum in a supporting frame it has shown to be an advantage that the rope material is guided over a roller arranged externally of the supporting frame. Another advantage of this form of execution resides in that the storage drum is in the form of a cage including plural supporting arms, namely three at least and preferably four to six, which are L- or U-shaped in cross-section, and is rotatably supported in the supporting frame. The cage-like design of the storage drum particularly allows material saving and hence a reduction in weight of the structural components of the apparatus according to the invention.

According to another feature of the present invention provisions are made for the pulley which is partially wrapped by the rope material to be relatively unrotatably arranged on an axle which extends parallel to and is offset from the rotational axle in the supporting frame.

Preferably, the guide groove formed in at least one of the pulleys is slightly smaller than the width of the driving belt, resulting in an improved transmission of power between the driving belt and the pulley. The driving belt preferably consists of an elastic material, particularly a highly elastic material having a high coefficient of adhesion. Advantageously, the outer surfaces of the pulleys and/or the guide grooves of the pulleys are coated or lined with an elastic material allowing a high static friction to be transmitted. With this form of execution, too an improved power transmission between the driving belt and pulley is attained. The elastic material of the pulley and/or the driving belt may have profiles adapted to penetrate slidable dirt of the rope material and to allow displaced dirt particles or fluid to evade into the intermediate spaces between the profiles.

In this connection it is an advantage that a high surface pressure is set between the driving belt and the pulleys which also acts on the dirt accumulation of the rope material and displaces the dirt particles particularly into the profile of the elastic material.

The driving belt, which is guided preferably via belt guide members such as edges, lugs, hooks, rollers, tubes, sliding surfaces, sliding stones, sliding cushions, fluid bearings, roller bearings or the like which in a coated or non-coated condition are designed with a low frictional resistance, may be formed as a flat belt with or without profiles, particularly with a toothing facing one of the pulleys. However, it is also possible that the driving belt at least in a part-portion thereof is formed as a chain, which part-portion is arranged particularly in that area which does not contact the rope material. However, the chain may also have rubber cushions on its side facing the rope material, which rubber cushions avoid direct contact between the chain and the rope material and hence damages to the rope material which might be the consequence of such contact.

It is further provided that at least one tension member, preferably a tension roller, is interposed in the area of the driving belt. Instead of the tension roller an elastical tension member which is preferably interposed between a chain-shaped portion and a driving belt portion may be provided as an alternative. In addition, the driving belt preferably passes over at least one deflection pulley.

Another feature of the present invention provides for pucks arranged in that area of the driving belt ascending or descending the pulley, said pucks preventing the driving belt and/or rope material from lifting off the pulley in this area and allowing the rope material to thread between the pulley and driving belt and/or into the guide tubes without manipulation. By this construction expensive repair work is avoided which is required in the event that the rope material has been completely drawn into the storage drum and therefore requires to be threaded anew into the guide tubes, for a new working cycle. Threading of the rope material into the guide tubes is then effected by the correspondingly formed pucks which are preferably provided with a guide groove in the outer surface thereof.

According to another feature of the invention it is provided that the storage drum and the pulley are supported on a common axle of rotation. With this construction friction losses are reduced due to a reduction of the movements of the storage drum relative to the pulley. The tendency of the drum to rotate will, when the rope material is wound off, lead to a pressure between the drum and the pulley, with a tensile load being caused between the driving belt and the storage drum while the rope material is pulled in.

To obtain a greater angle of wrap of the driving belt it may be provided, according to another feature of the invention, that the driving belt is guided in loops over plural deflection pulleys. As an alternative it may be provided that the pulley or pulleys are supported on the outer surface thereof. In this case it is not necessary that the pulley is supported on an axle, so that the construction of the apparatus is simplified with respect to the support of the storage drum which is preferably formed to be exchangeable.

In addition, further means and devices are provided serving for easy handling of the apparatus according to the invention. For instance, a recognition means may be provided on the extremity of the rope material which, for example, is in the form of a visual sensor and which stops the drive of the pulley as soon as the recognition means is moved past a particular point within the guide tubes. However, also other types of limit stops may be provided which for instance detect the end of the rope material from the number of revolutions.

In addition, various variants of the driving unit are conceivable. For example, the driving unit may directly act on the pulley adjacent the storage drum. However, it is also possible that both pulleys have a seat for a changeable crank handle. Such seats can be formed, for example, with an inner toothing cooperating with the outer toothing of the crank handle. In addition, a toothed gearing may be provided between the driving unit and the driven pulley through which the torque of the driving unit can be transmitted to the pulley in a positive fashion, wherein also a particular transmission ratio can be set through the toothed gearing in response to the diameter of the drum and the related storage capacity for the rope material. Here, a number of toothed gearings are conceivable such as a bevel gear, worm gear or also a planetary gear, wherein the ring gear of the planetary gear will then act as the single traction wheel.

Moreover, the driving belt may be guided at least in a portion between the pulleys in guide members in order to substantially avoid dirt accumulation of the driving belt. It is also conceivable that the driving belt at least in the portion between the pulleys runs over a plurality of small diameter rollers acting as pressing members.

Further features and advantages of the invention will become apparent from the following detailed description of the attached drawings representing preferred embodiments of the apparatus according to the invention. It is shown in.

Figure 1:
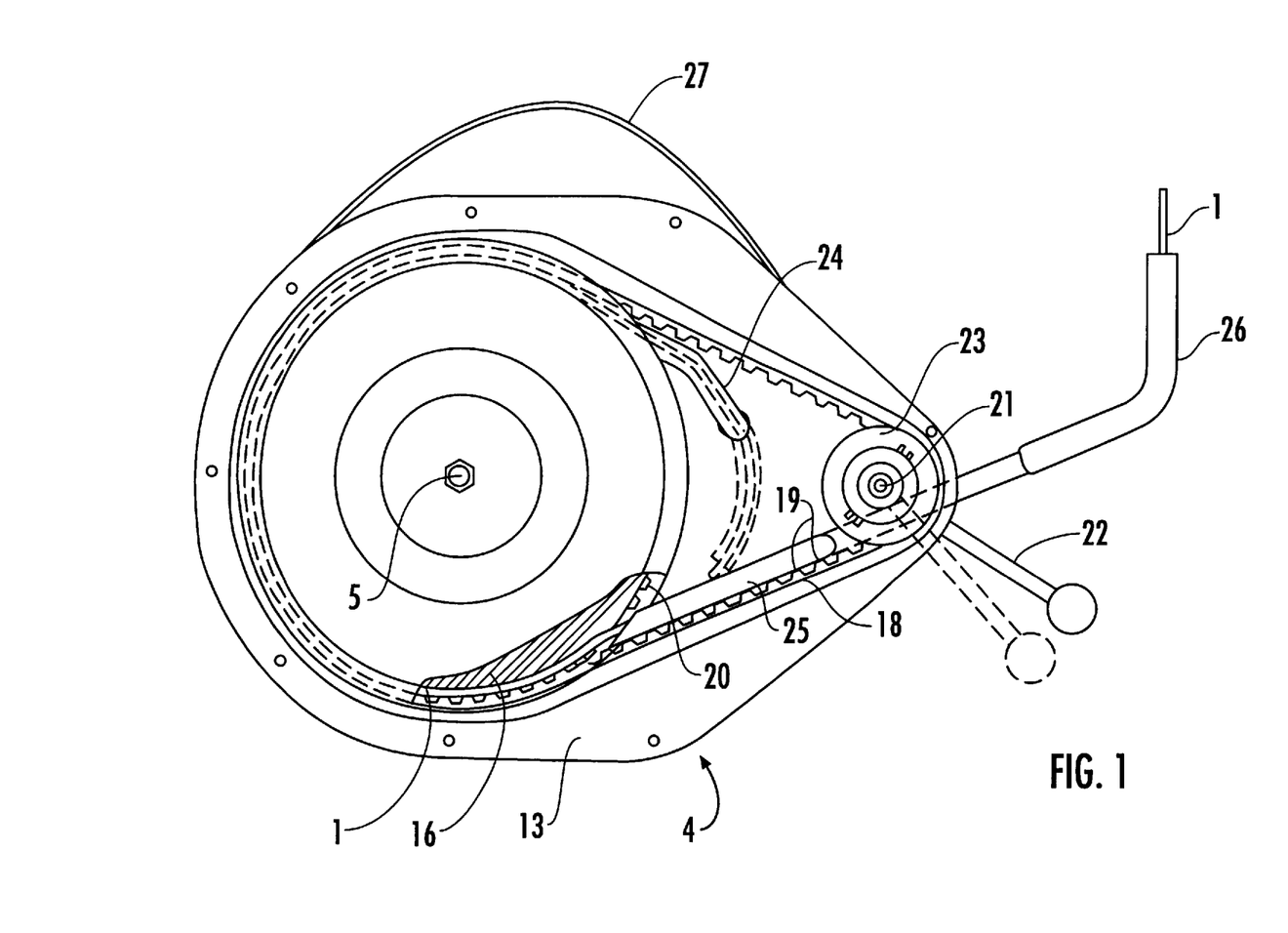
FIG. 1 a first embodiment of an apparatus for the storage and withdrawal of an elastically flexible rope material, in a partly sectional plan view.
Figure 2:
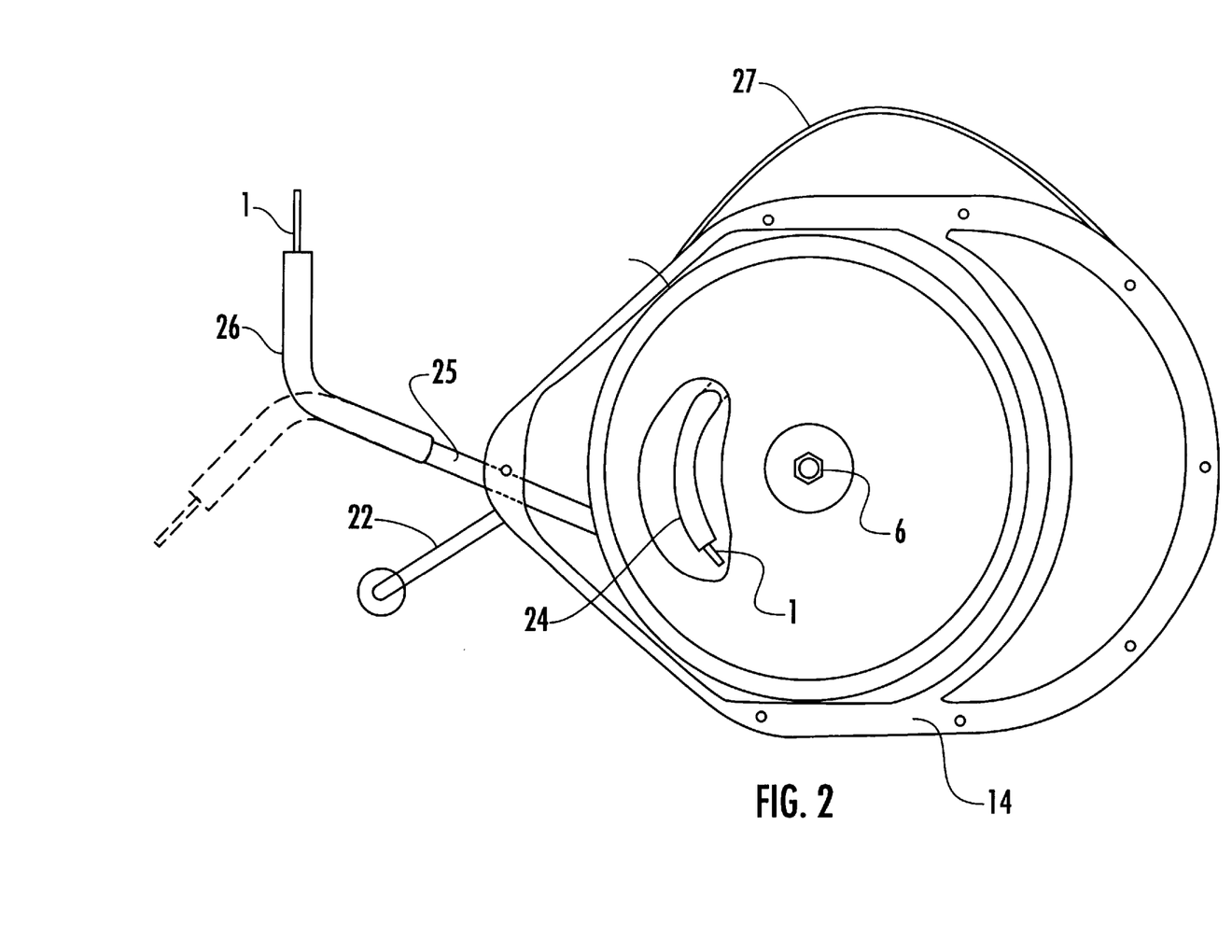
FIG. 2 the apparatus of FIG. 1 in a partly sectional rear view.
Figure 3:
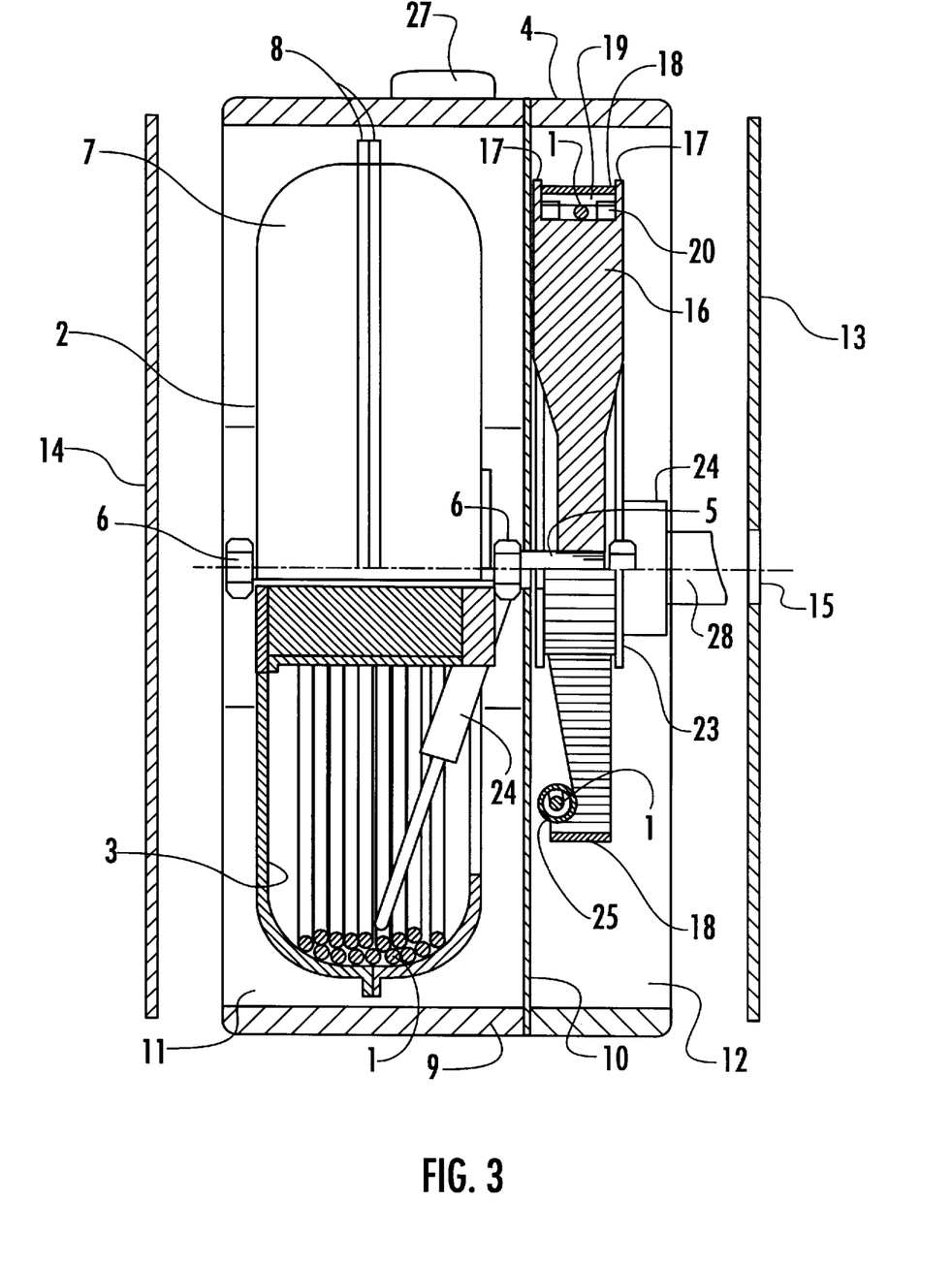
FIG. 3 the apparatus of FIGS. 1 and 2 in a sectional side view.

An apparatus for the storage and withdrawal of an elastically flexible rope material 1 consists of a storage drum 2, with the elastically flexible material 1 nestling against the inner wall 3 thereof. The storage drum 2 is rotatably supported within a housing 4, wherein said housing 4 comprises a rotational axle 5 on which the storage drum 2 is relatively unrotatably arranged between two nuts 6.

The storage drum 2 consists of two shells 7 having a substantially U-shaped cross-section and having a continuous flange 8 on their rim portion. Each flange 8 comprises a plurality of unillustrated circumferentially distributed bores having fitted therein unillustrated screw bolts to which unillustrated nuts are screwed, so that both shells 7 are screwed to each other in the area of said two flanges 8.

The housing consists of a frame 9 which has a wall surrounding the storage drum 2. Within the frame 9 a partition wall 10 is arranged for dividing said housing 4 into two sections 11 and 12. Said two sections 11 and 12 are covered by side walls 13 and 14, of which side wall 13 covering section 12 of the housing 4 includes an opening 15. The rotational axle 5 is supported in partition wall 10.

Within section 12 a pulley 16 is arranged on the rotational axle 5 and connected thereto to be relatively unrotatable. Pulley 16 is formed in its circumferential surface area with a U-shaped cross-section and accordingly includes two plate-shaped members 17. Between these plate-shaped members 17 a driving belt formed as a toothed belt 18 is arranged which wraps pulley 16 over part of its circumference. The toothed belt 18 is provided on its surface facing the pulley 16 with a plurality of teeth meshing with corresponding tooth members 20 equidistantly arranged in a circulating fashion at either side of the plate-shaped members 17 on the circumferential surface of pulley 16.

As is shown particularly by FIG. 1, a second axle 21 is arranged within the housing 4 having supported thereon a second pulley 23 driven by means of a crank handle 22, said second pulley 23 being wrapped by the toothed belt 18 over part of its circumference. Pulley 23 is also formed as a toothed disk, which comprises a plurality of teeth correspondingly meshing with the teeth 19 of the toothed belt 18. The crank handle 22 is relatively unrotatably fixed to the axle 21, wherein said axle 21 penetrates opening 15.

Pulley 23 has a diameter which is substantially smaller than the diameter of pulley 16. The diameter of pulley 16 substantially corresponds to the internal diameter of the storage drum 2.

As can been seen in FIG. 3, the rope material 1 leaves the storage drum 2 by passing into a guide tube 24 from where the material 1, which consists of polypropylene-coated glass fiber plastic and which is formed as a push-and-pull wire, ascends pulley 16 between said two plate-shaped members 17 and reaches underneath the toothed belt 18. The rope material 1 is, by virtue of the biasing of the toothed belt 18, clamped between the pulley 16 and the toothed belt 18, with a frictional connection being established between the toothed belt 18 and the material 1 as well as between the material 1 and the pulley 16.

The rope material 1 wraps the pulley 16 at an angle area of approximately 250° before it enters into a guide tube 25 immediately after having left the circumferential surface of the pulley 16, said guide tube 25 guiding the rope material 1 laterally beside pulley 23, namely between the partition wall 10 and the driving belt 18 from where the rope material 1 is guided out of the housing 4. Onto the free end, i.e. the end of the guide tube 25 protruding from the housing 4, an angled guide member 26 is fixed for rotation.

FIGS. 1 to 3 further show that a carrying handle 27 is provided on the housing 4. Finally, FIG. 3 shows the driving shaft 28 connecting the crank handle 22 to the pulley 23 or axle 21.

Figure 4:
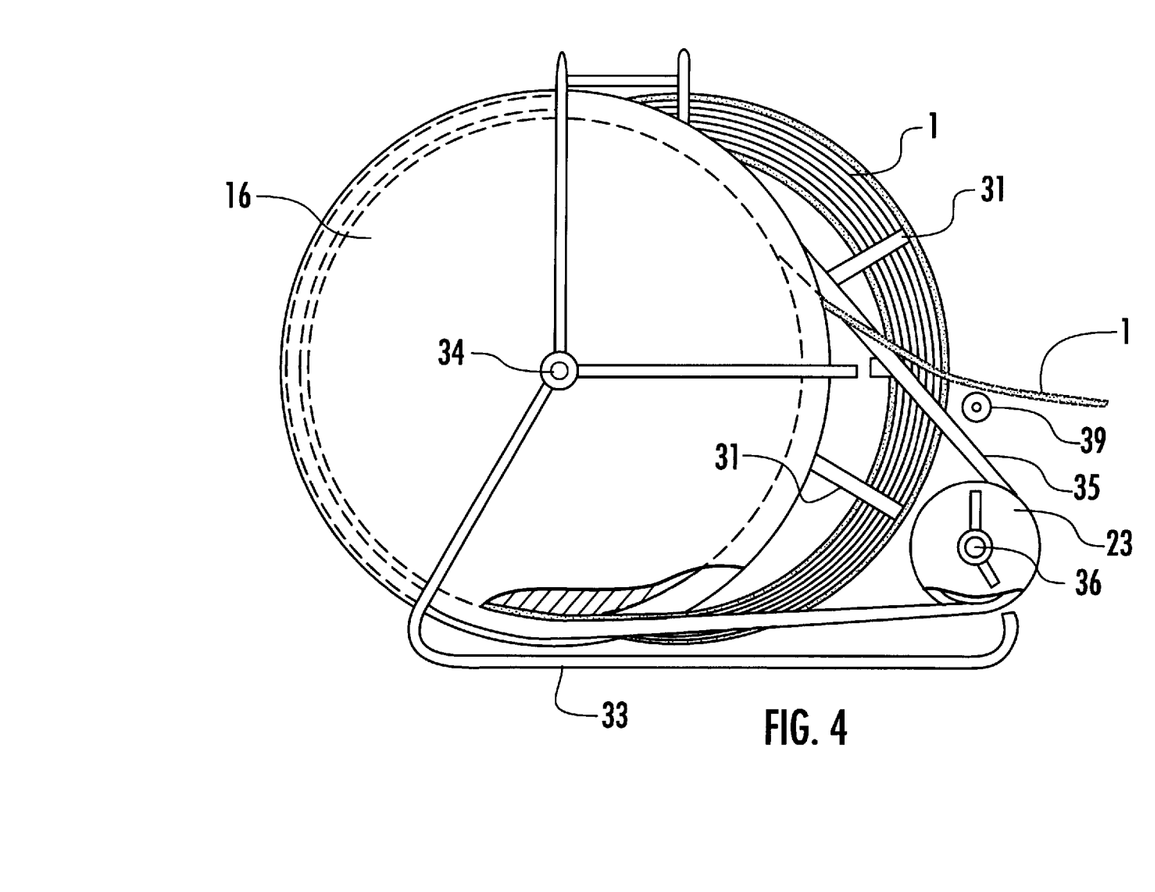
FIG. 4 a second embodiment of an apparatus for the storage and withdrawal of an elastically flexible rope material in a side view.
Figure 5:
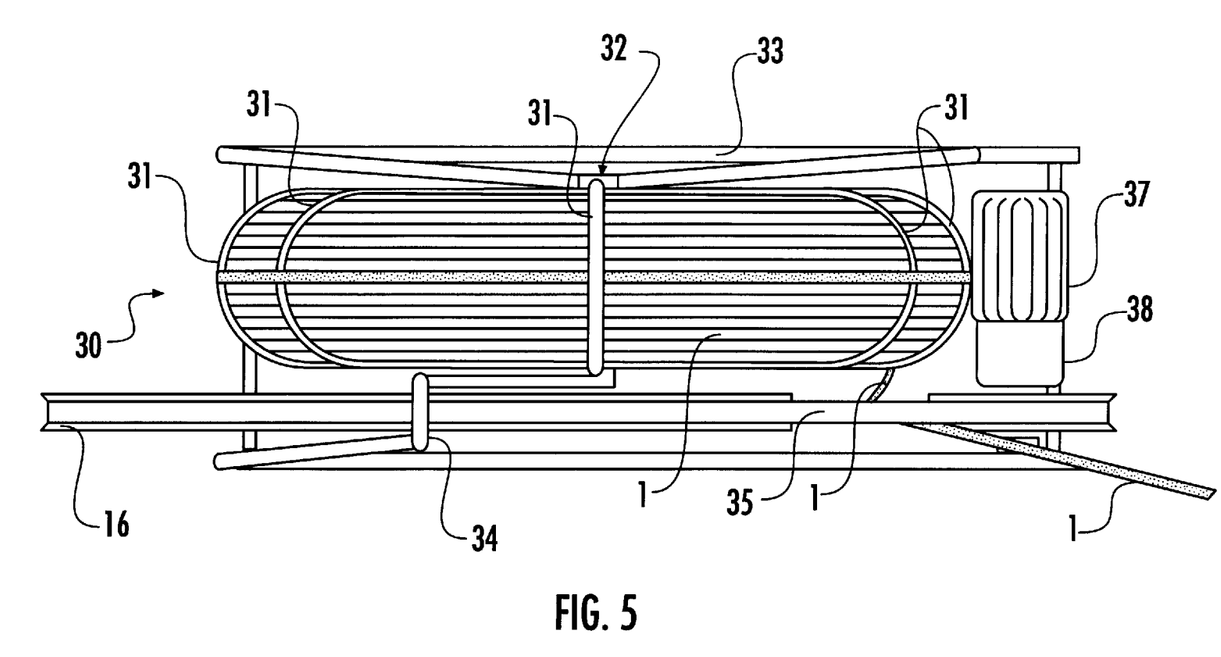
FIG. 5 the apparatus of FIG. 4 in a top view.

A second embodiment of the apparatus according to the present invention is shown by FIGS. 4 and 5, this embodiment being different from the first embodiment of FIGS. 1 to 3 by that the elastically flexible rope material 1 is arranged within a storage drum formed as a cage 30. The cage 30 consists of plural supporting arms 31 having a substantially U-shaped cross-section which are fixed to a rotational axle 32 by one end thereof and are equidistantly arranged on an orbit.

The rotational axle 32 is supported in a supporting frame 33, in which the cage 30 may be rotated.

Within said supporting frame 33 an additional axle 34 is arranged offset from the rotational axle 32 and on which a pulley 16 is mounted for rotation. The pulley 16 is wrapped by a driving belt 35 in a part-portion thereof. The driving belt 35 further wraps a second pulley 23 having a smaller diameter and being also supported on axle 36 within the bearing frame 33, said axle 36 being driven by an electric motor 37 topped with a gear 38.

The material 1 withdrawn from the cage 30 ascends the circumferential surface of pulley 16 in the bottom area thereof and is clamped between the pulley 16 and the driving belt 35, so that the material 1 is frictionally connected to the driving belt 35 and the pulley 16. The material 1 wraps the pulley 16 at the same angle area as the driving belt 35, before the material 1 leaves the circumferential surface of pulley 16 and is fed via a guide roller 39 for instance to an empty cable tube. Here, the guide roller 39 is also arranged within the supporting frame 33.

The above-described apparatus is particularly suited for applications where great lengths of the elastically flexible rope material 1 are to be wound up or wound off, considering particularly the laying of underground cables in corresponding empty cable tubes.

Figure 6:
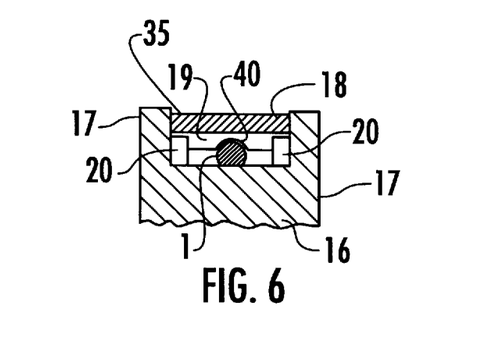
FIG. 6 a first embodiment of a pulley with a driving belt in a sectional side view.
Figure 7:
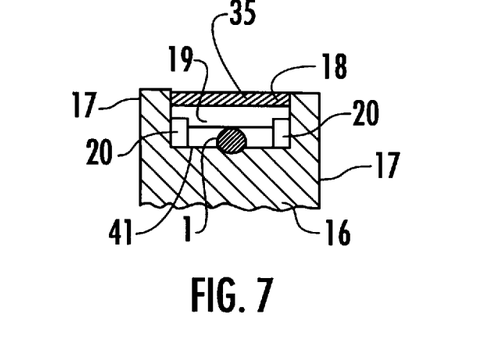
FIG. 7 a second embodiment of a pulley with a driving belt in a sectional side view.
Figure 8:
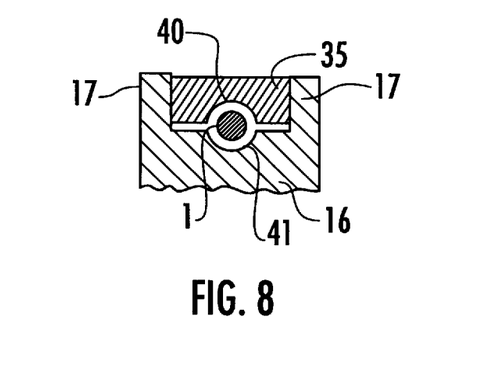
FIG. 8 a third embodiment of a pulley with a driving belt in a sectional side view.

In FIGS. 6 to 8 various forms of execution of the pulley 16 or toothed belt 18 or toothed belt 35 are shown.

A first form of execution is illustrated in FIG. 6, where the toothed belt 18 includes a semicircular recess 40 in the area of its teeth 19 which is matched for the outer contour of the material 1. The second form of execution shown in FIG. 7 provides for a recess 41 in the bottom of the continuous groove formed in the outer circumferential area of the pulley 16, between the members 17.

A third form of execution is finally shown in FIG. 8, wherein recesses 40 and 41 are provided both in the driving belt 35 and the bottom of the groove formed between the members 17, with the cross-sectional shape of these recesses corresponding to the outer contour of the material 1.

| List of reference numbers | |
| --- | --- |
| 1 material | 21 axle |
| 2 storage drum | 22 crank handle |
| 3 inner wall | 23 pulley |
| 4 housing | 24 guide tube |
| 5 rotational axle | 25 guide tube |

| -continued | |
| --- | --- |
| List of reference numbers | |
| 6 nut | 26 guide member |
| 7 shell | 27 carrying handle |
| 8 flange | 28 driving shaft |
| 9 frame | |
| 10 partition wall | 30 cage |
| 11 housing section | 31 supporting arm |
| 12 housing section | 32 rotational axle |
| 13 side wall | 33 supporting frame |
| 14 side wall | 34 axle |
| 15 opening | 35 driving belt |
| 16 pulley | 36 axle |
| 17 plate-shaped member | 37 electric motor |
| 18 driving belt | 38 gear |
| 19 tooth | 39 guide roller |
| 20 tooth member | 40 recess |
| | 41 recess |

It is claimed:

1. Apparatus for the storage and withdrawal of an elastically flexible rope material, into cable or line protection tubes or empty tubes, comprising a storage drum, with the elastically flexible material nestling against an inner wall thereof, and a housing or a supporting frame having arranged therein a rotational axle for rotatably supporting said storage drum, whereby the rope material, after leaving the storage drum and before leaving the housing or the supporting frame, is at least over a part-portion driven by a driving means non-positively acting on the rope material and whereby the driving means is in the form of an endless driving belt revolving over at least two pulleys, wherein at least one pulley is relatively unrotatably fixed on a rotational axle and wherein at least one pulley is driven.

2. Apparatus according to claim 1, characterized in that the rope material is arranged over part of the circumference of one of the pulleys, and between the pulley and the driving belt.

3. Apparatus according to claim 1, characterized in that the driving belt is in the form of a toothed belt and one of the pulleys is in the form of a toothed disk.

4. Apparatus according to claim 1, characterized in that one of the pulleys is arranged on an axle spaced from the rotational axle of the storage drum, within the housing.

5. Apparatus according to claim 4, characterized in that the pulley relatively unrotatably fixed on the axle is driven.

6. Apparatus according to claim 1, characterized in that the two pulleys have different diameters and the smaller diameter pulley is driven.

7. Apparatus according to claim 1, characterized in that the pulley relatively unrotatably fixed on the rotational axle has a diameter which substantially corresponds to the diameter of the storage drum.

8. Apparatus according to claim 1, characterized in that each pulley includes a guide groove for the driving belt, wherein the groove is U-shaped in cross-section and is circumferentially arranged.

9. Apparatus according to claim 8, characterized in that tooth members are arranged in the lateral rim portion of the guide groove meshing with corresponding teeth of the driving belt.

10. Apparatus according to claim 8, characterized in that in the bottom of the guide groove a recess is provided, the recess having a semicircular cross-section having a radius substantially corresponding to the radius of the rope material (1).

11. Apparatus according to claim 1, characterized in that the driving belt on its surface facing the pulleys includes a recess, the recess having a substantially semicircular cross-section having a radius substantially corresponding to the radius of the rope material.

12. Apparatus according to claim 1, characterized in that the rope material wraps the pulley relatively unrotatably fixed on the rotational axle at an angle of wrap between 180° and 280°.

13. Apparatus according to claim 1, characterized in that the rope material is guided in a guide tube relatively unrotatably fixed on the rotational axle.

14. Apparatus according to claim 13, characterized in that an angled guide member is plug-fitted onto the guide tube, the angled guide member being rotatably supported on the guide tube.

15. Apparatus according to claim 13, characterized in that the guide tube is arranged laterally beside the driving belt.

16. Apparatus according to claim 1, characterized in that the driving belt is manually driven via one of the pulleys.

17. Apparatus according to claim 1, characterized in that the driving belt is driven via one of the pulleys through a motor.

18. Apparatus according to claim 1, characterized in that the rope material is guided over a roller arranged externally of the supporting frame.

19. Apparatus according to claim 1, characterized in that the storage drum is in the form of a cage, which has at least three supporting arms, the supporting arms each having an L-shaped cross-section, and the storage drum rotatably supported in the supporting frame.

20. Apparatus according to claim 1, characterized in that the axle of the pulley relatively unrotatably fixed on the rotational axle is arranged parallel to and offset from the rotational axle of the storage drum.

21. Apparatus according to claim 8, characterized in that the guide groove formed in at least one pulley is slightly smaller than the width of the driving belt or the rope material.

22. Apparatus according to claim 1, characterized in that the driving belt consists of an elastical material.

23. Apparatus accoring to claim 8, characterized in that the outer surfaces of the pulleys or the guide grooves are provided with a coating or lining of elastical material having a high coefficient of adhesion.

24. Apparatus according to claim 22 or claim 23, characterized in that the elastical material includes a profile.

25. Apparatus according to claim 1, characterized in that a high surface pressure exists between the driving belt and the pulleys.

26. Apparatus according to claim 1, characterized in that the driving belt is guided over belt guide members.

27. Apparatus according to claim 1, characterized in that the housing has arranged thereon a carrying belt.

28. Apparatus according to claim 1, characterized in that the driving belt is formed as a flat belt.

29. Apparatus according to claim 1, characterized in that the storage drum is removably supported within the housing.

30. Apparatus according to claim 1, characterized in that the rotational axle of the storage drum and the rotational axle of the pulley are integral.

31. Apparatus according to claim 14, wherein the angled guide member is locked.

32. Apparatus according to claim 31, wherein the angled guide member is locked on the guide tube.

33. Apparatus according to claim 15, characterized in that the guide tube is arranged between the driving belt and the storage drum.

34. Apparatus according to claim 16, characterized in that the driving belt is manually driven through a crank handle.

35. Apparatus according to claim 17, characterized in that the motor is an electric motor.

36. Apparatus according to claim 17, characterized in that the motor is an hydraulic motor.

37. Apparatus according to claim 19, characterized in that the cage has four to six supporting arms.

38. Apparatus according to claim 22, characterized in that the elastical material has a high coefficient of adhesion.

39. Apparatus according to claim 28, characterized in that the flat belt comprises a toothing facing one of the pulleys.

* * * * *